United States Patent [19]
Sperling et al.

[11] Patent Number: 5,930,403
[45] Date of Patent: Jul. 27, 1999

[54] METHOD AND APPARATUS FOR HALF PIXEL SAD GENERATION UTILIZING A FIFO BASED SYSTOLIC PROCESSOR

[75] Inventors: Erez Sperling, Amikam; Michal Harlap, Tel Aviv; Amir Freizeit, Ra'anana; Gil Skaletzky, Karkur; Moshe Steiner, Haifa, all of Israel

[73] Assignee: Zapex Technologies Inc., Mountain View, Calif.

[21] Appl. No.: 08/775,342

[22] Filed: Jan. 3, 1997

[51] Int. Cl.[6] .................................................. G06K 9/36
[52] U.S. Cl. ........................ 382/276; 382/197; 382/209; 382/233; 382/239; 382/298; 382/299; 382/300
[58] Field of Search ................................... 382/276, 197, 382/209, 233, 239, 299, 298, 300

[56] References Cited

U.S. PATENT DOCUMENTS

| | | | |
|---|---|---|---|
| 5,181,111 | 1/1993 | Hendley et al. ...................... 358/105 |
| 5,208,667 | 5/1993 | Saunders ................................. 358/105 |
| 5,461,423 | 10/1995 | Tsukagoshi ............................ 348/699 |
| 5,594,813 | 1/1997 | Fandrianto et al. ..................... 382/30 |
| 5,682,205 | 10/1997 | Sezan et al. ............................ 348/208 |

*Primary Examiner*—Christopher Kelley
*Assistant Examiner*—Sheela Chawan
*Attorney, Agent, or Firm*—McDermott, Will & Emery

[57] ABSTRACT

A novel apparatus for and method of calculating the SAD values for half pixels is disclosed. The invention interpolates, in a serial fashion, half pixel values from full pixels contained in a search window. These half pixels are then compared with pixels in a template macro block. The differences are then generated and accumulated in registers. The search window and template macro block pixels are shifted into FIFOs whereby a plurality of adders generates half pixel values. Latches are used to store and delay the half pixel values for input to a bank of subtractors. The subtractors calculate the differences between the interpolated half pixels and the template macro block pixels. The output of the subtractors are accumulated resulting in eight SAD values.

12 Claims, 5 Drawing Sheets

METHOD AND APPARATUS FOR HALF PIXEL SAD GENERATION UTILIZING A FIFO BASED SYSTOLIC PROCESSOR

FIELD OF THE INVENTION

The present invention relates generally to motion estimation encoders and more particularly relates to the determination of half pixel motion vectors using sum of the absolute difference calculations.

BACKGROUND OF THE INVENTION

It is common in video compression systems to require the movement of blocks of pixels to be estimated from one frame to the next. Rather than send the full frame of video information, only the deltas or movements, known as motion vectors, of the blocks of pixels need be sent. Video compression encoders perform such processing which results in a video bit rate greatly reduced form the original. Starting with the original initial frame, a video decoder can reconstruct the original frames by utilizing the motion vectors previously calculated for each of the blocks in the frame. A more in depth discussion of the motion estimation process can be found in "Image and Video Compression Standards, Algorithms and Architectures," by Vasudev Bhaskaran and Konstantinas Konstantinides.

Video compression encoders currently exist that can perform motion estimation on half pixels. However, they are generally large in size and are expensive. In line with the long term trend of manufacturing smaller and less expensive products, it would be very desirable to reduce the size, weight, cost and complexity of video compression encoders. In particular, the motion estimation portion of the video compression encoder would benefit a great deal if its size and cost were both reduced.

SUMMARY OF THE INVENTION

Accordingly, it is an object of the present invention to provide a half pixel SAD generator that overcomes the disadvantages of the prior art.

It is another object of the present invention to provide a half pixel SAD generator that calculates SAD values for all eight possible half pixel locations surrounding a full pixel location.

Another object of the present invention is to provide a half pixel SAD generator that calculates the SAD value for each half pixel position on a serial basis.

Yet another object of the present invention is to provide a half pixel SAD generator that does not require all search window pixels and their corresponding interpolated half pixels to be available at the same time or to be accessed more than once.

A novel apparatus for and method of calculating the SAD values for half pixels is disclosed. The invention interpolates, in a serial fashion, half pixel values from full pixels contained in a search window. These half pixels ire then compared with pixels in a template macro block. The differences are then generated and accumulated in registers. The search window and template macro block pixels are shifted into FIFOs whereby a plurality of adders generates half pixel values. Latches are used to stare and delay the half pixel values for input to a bank of subtractors. The subtractors calculate the differences between the interpolated half pixels and the template macro block pixels. The output of the subtractors are accumulated resulting in eight SAD values.

There is therefore provided in accordance with a preferred embodiment of the present invention an apparatus for generating half pixel sum of the absolute differences (SAD) between a block of full pixels contained within a search window memory and template pixels contained in a predefined template macro block memory, the apparatus comprising search window first in first out (FIFO) means for holding full pixels contained in the search window, template macro block FIFO means for holding template pixels contained in the template macro block, interpolating means coupled to the search window FIFO means, the interpolating means for calculating the values of half pixels surrounding each full pixel, subtracting means coupled to the interpolating means and the template macro block FIFO means, the subtracting means for calculating the difference between the half pixels and the template pixels, absolute value means coupled to the subtracting means, the absolute value means for generating the absolute value of the output of the subtracting means, accumulator means coupled to the output of the absolute value means, the accumulator means for maintaining a sum of the absolute differences output by the absolute value means for each of the half pixel SAD values, and controller means for generating the appropriate control signals to enable the generation of the half pixel SAD values.

In addition, the search window FIFO comprises a sufficient number of registers to hold an entire row of full pixels plus at least one pixel from the following row from the search window. The template macro block FIFO comprises a sufficient number of registers to hold an entire row of full pixels plus at least one pixel from the following row from the template macro block. The interpolating means comprises adders and registers suitably arranged so as to calculate the values of half pixels surrounding each the full pixel. The subtraction means comprises two input subtractors.

The subtraction means and the absolute value means together comprise two input subtractors incorporating an absolute value function. The accumulator means and the absolute value means together comprise an accumulator incorporating an absolute value function at its input. Each full pixel and each template pixel are accessed from the search window memory and the template macro block memory, respectively, only once.

There is further provided in accordance With a preferred embodiment of the present invention a method for generating half pixel sum of the absolute difference (SAD) values between a block of full pixels contained within a search window memory and template pixels contained in a predefined template macro block memory, the method comprising the steps of providing a search window first in first out (FIFO) for shifting through full pixels contained in the search window, providing a template macro block FIFO for shifting through template pixels contained in the template macro block, interpolating one time only for each of the full pixels, the values of half pixels surrounding each of the full pixels in the horizontal, vertical and diagonal directions, calculating the difference between the half pixels and the template pixels, determining the absolute value of the differences generated during the step of calculating, and accumulating a sum of the absolute differences generated during the step of determining for each of the half pixels SAD values.

Each full pixel and each template pixel are accessed from the search window memory and the template macro block memory, respectively, only once.

BRIEF DESCRIPTION OF THE DRAWINGS

The invention is herein described, by way of example only, with reference to the accompanying drawings, wherein.

DETAILED DESCRIPTION OF THE INVENTION

As stated previously, video compression is currently being used in a wide variety of applications. Video compression standards Such as the MPEG 2 standard define the output specifications of video encoders. Video encoders function to compress the video stream from its relatively large original bandwidth to a much smaller bandwidth. The encoded video stream can then be transmitted onto a communication channel or stored in a storage medium, for example. In either case, the bandwidth requirements of the communications channel are greatly reduced and the amount of storage required to hold the video program is also greatly reduced. The encoding of a video stream, in the MPEG 2 standard, for example, requires estimating the changes in the motion between consecutive frames. This process is termed motion estimation. A more in depth discussion of the motion estimation process can be found in "Image and Video Compression Standards, Algorithms and Architectures," by Vasudev Bhaskaran and Konstantinas Konstantinides, Chapter 11, which is incorporated herein by reference. First, the frame is broken up into blocks of pixels, 16 by 16 pixels large, for example, and then for each block in the current frame, the best matching block in the previous frame is found. Rather than transmit the same block over again in full, the change in the position (i.e., the movement) of the block from the previous frame to the current frame is sent instead, greatly reducing the data needed to be transmitted.

The present invention, embodying an apparatus for and a method of generating half pixel SAD values for data in a search area, is disclosed and described within the context of a video compression system. This, however, in no way limits the application of the present invention to other areas as well. The present invention is applicable in any type of system that requires processing (e.g., finding a best match) of interpolated values derived from a template of data against a search window. In addition, the calculation criteria can be anything that is a function of the data within the template of data and the data in the search window (e.g., choosing the best match using SAD values).

The example video compression scheme presented herein utilizes a motion estimation method which uses a search window having a particular size. Each block of pixels, termed a template macro block, in the current frame is compared against each block within the search window which contains data from the previous frame. Typically, the search window is a subset of the frame area rather than the entire frame since it is not likely that objects move very far from one frame to the next. Using a reduced search window reduces the computation time needed to find the best matching block.

In the example used throughout this document, the search window comprises a plurality of blocks each 4×4 pixels. The data in the search window is processed on a block by block basis. The search begins in the upper left corner of the search window whereby the matching function is performed on the block in the upper left corner. Then, the block is shifted right by one pixel and the matching function is performed again. This process is repeated pixel by pixel until the end of the first row of pixels is reached. Apparatus for and a method of performing a full pixel search are described in detail in U.S. patent application Ser. No. 08/754,059, filed Dec. 4, 1996, now U.S. Pat. No. 5,788,410, entitled APPARATUS FOR AND METHOD OF REDUCING THE MEMORY BANDWIDTH REQUIREMENTS OF A SYSTOLIC ARRAY, by Skeletzky et al., similarly assigned and incorporated herein by reference.

The present invention would typically, but not necessarily, be utilized after the full pixel SAD result is obtained. First, the data in the search window is compared block by block with the template macro block data to determine the best matching block of pixels. During this search only full pixels are considered. Once the position of the best matching full pixel block is found, a half pixel search can be performed to further improve the resolution of the search. Performing a half pixel search results in an increase in the potential resolution of the system by a factor of four (by two for each axis) Half pixel accuracy is related to the half pixel SAD calculations. The half pixel SAD calculations are determined by comparing template macro block pixels to a special search window which corresponds to the half pixels surrounding the full pixel target location.

Figure 1:
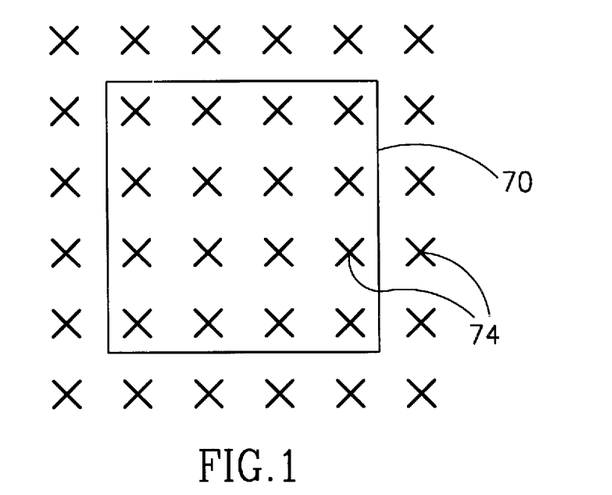
FIG. 1 illustrates a portion of a sample search window memory and the area corresponding to a template macro block of size 4×4.

A portion of a sample search window memory and the area corresponding to a template macro block of size 4×4 is illustrated in FIG. 1. The best matching block in the search window found during the full pixel search is indicated by the square box 70. Each 'X' 74 represents a full pixel in the search window.

Figure 2:
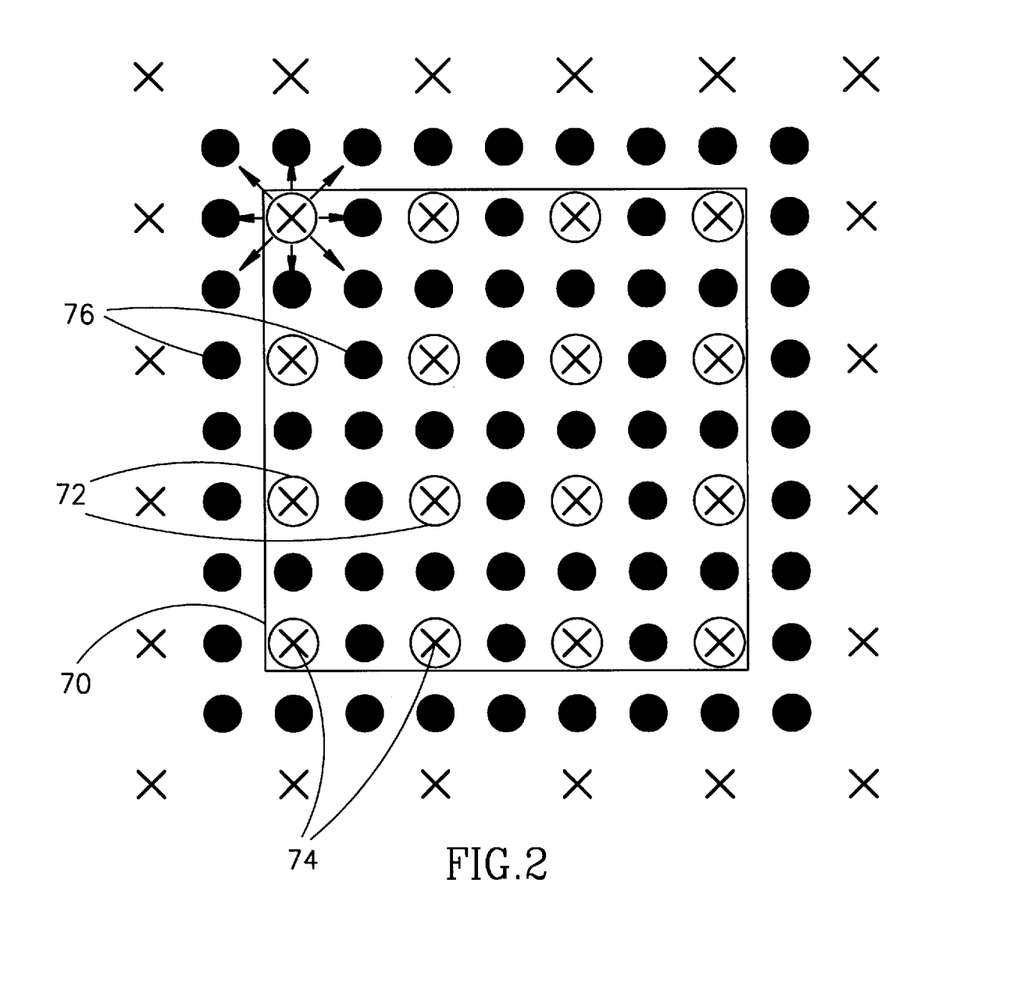
FIG. 2 illustrates a portion of the search window memory, the area corresponding to a template macro block of size 4×4 and the eight half pixels surrounding each full pixel.

To perform a half pixel search, the pixels surrounding the perimeter of the best matching full pixel block are utilized. This is illustrated in FIG. 2. The pixels represented by the large bold 'X's 74 represent pixels in the search window. The pixels 74 within the box 70 are the search widow pixels found to be a best match during the full pixel search. The circles 72 represent the template macro block pixels used in the full pixel search. In similar fashion to the full pixel search, the half pixel search utilizes the template macro block pixels 72 to determine the best matching half pixel block. The solid dots 76 represent the half pixels associated with the full pixel search results. The half pixels are calculated from the full pixels in the search window. The present invention comprises an apparatus and a method for calculating these half pixels. The eight possible half pixels 76 for the top left full pixel are indicated by the arrows. Each half pixel is compared with the template macro block pixels to generate eight SAD values. Thus, the combination of full and half pixel searches results in nine SAD results (i.e., the one full pixel result plus the eight half pixel results). The minimum of the nine SAD results is determined and used to generate the resulting motion vector. Note that as a result of the half pixel SAD calculations, it may turn out that none of the eight half pixel SAD values are smaller than the full pixel SAD result. In this case the motion vector is determined from the full pixel block previously calculated.

Figure 3:
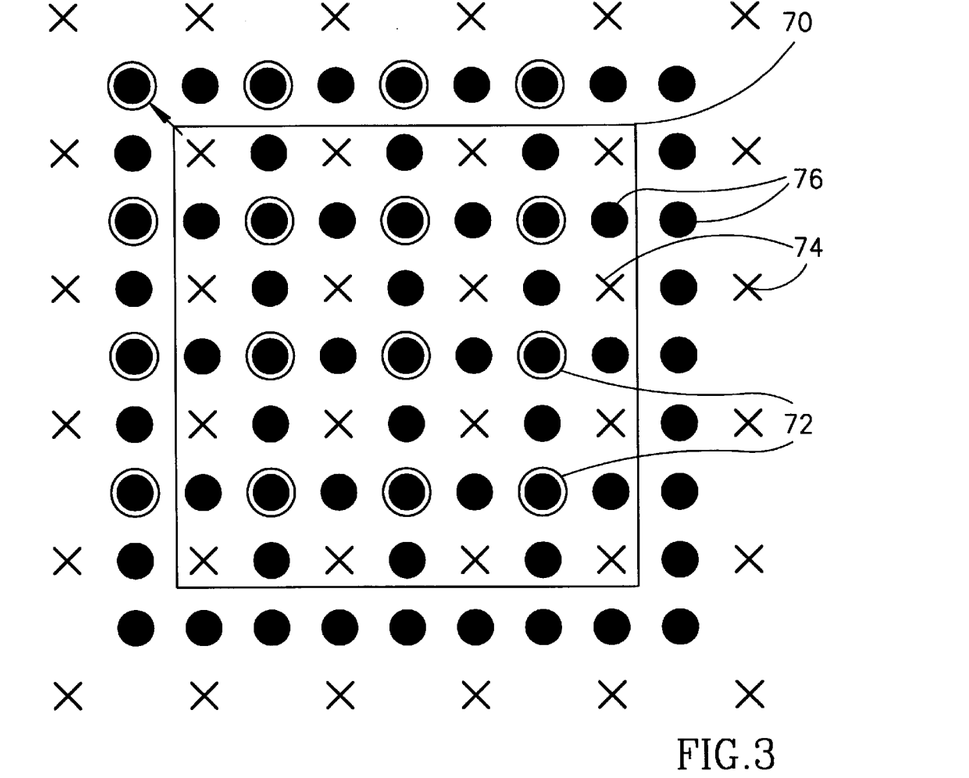
FIG. 3 illustrates one of eight possible best half pixel matches for the template macro block situated within the box.

One of eight possible best half pixel matches for the template macro block represented by the circles is illustrated in FIG. 3. In order to determine which of the eight possible half pixels 74 is the best matching, the template macro block pixels 72 must be compared to each of the eight half pixels separately. FIG. 3 illustrates the template macro block pixels being compared against the block of half pixels associated with the top left half pixel as indicated by the arrow. The absolute differences from all sixteen comparisons is summed to yield the SAD result for one of the eight half pixels. This process is repeated for the remaining seven half pixels. Once all eight SAD results are obtained, they are combined with the previously calculated full pixel SAD result and the minimum SAD from all nine is determined.

Figure 4:
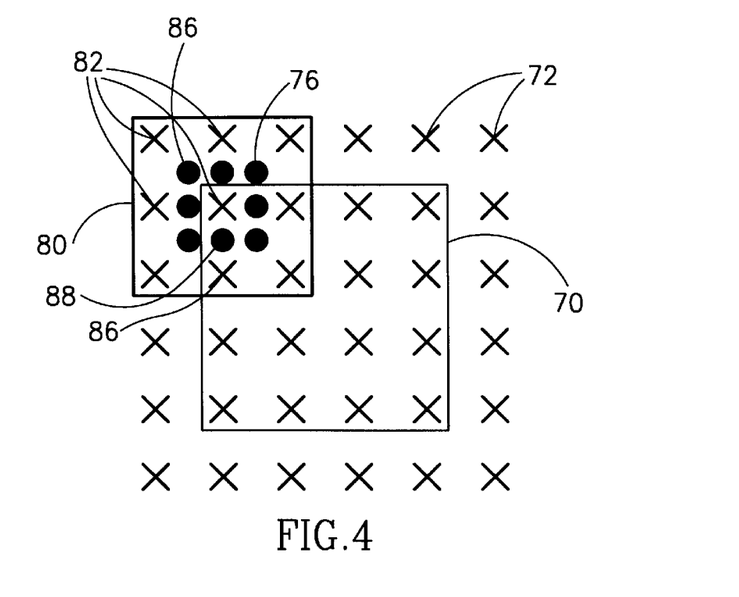
FIG. 4 illustrates the eight half pixel locations associated with the top left pixel in the template macro block.

To better illustrate the half pixel search, the eight half pixel locations associated with the top left pixel in the template macro block is shown in FIG. 4. As stated previously, the results from the full pixel search are enclosed within the square box 70. The search window full pixels needed to determine the half pixels 76 surrounding the top left corner full pixel in the box are enclosed within square box 80. For the top left corner full pixel, four pixels in the block 70 and five pixels out of the block are required. The corner half pixels are determined by summing the four full pixels surrounding them and ultimately dividing by four to obtain an average of the four pixels. For example, the corner half pixel 86 is determined by summing the four full pixels referenced 82 and ultimately dividing by four. The non corner half pixels are determined by calculating the two half pixels on either side and dividing by two. For example, the half pixel 88 is obtained by summing full pixels 84 and the lower right corner pixel 82 and ultimately dividing the result by two.

Figure 5:
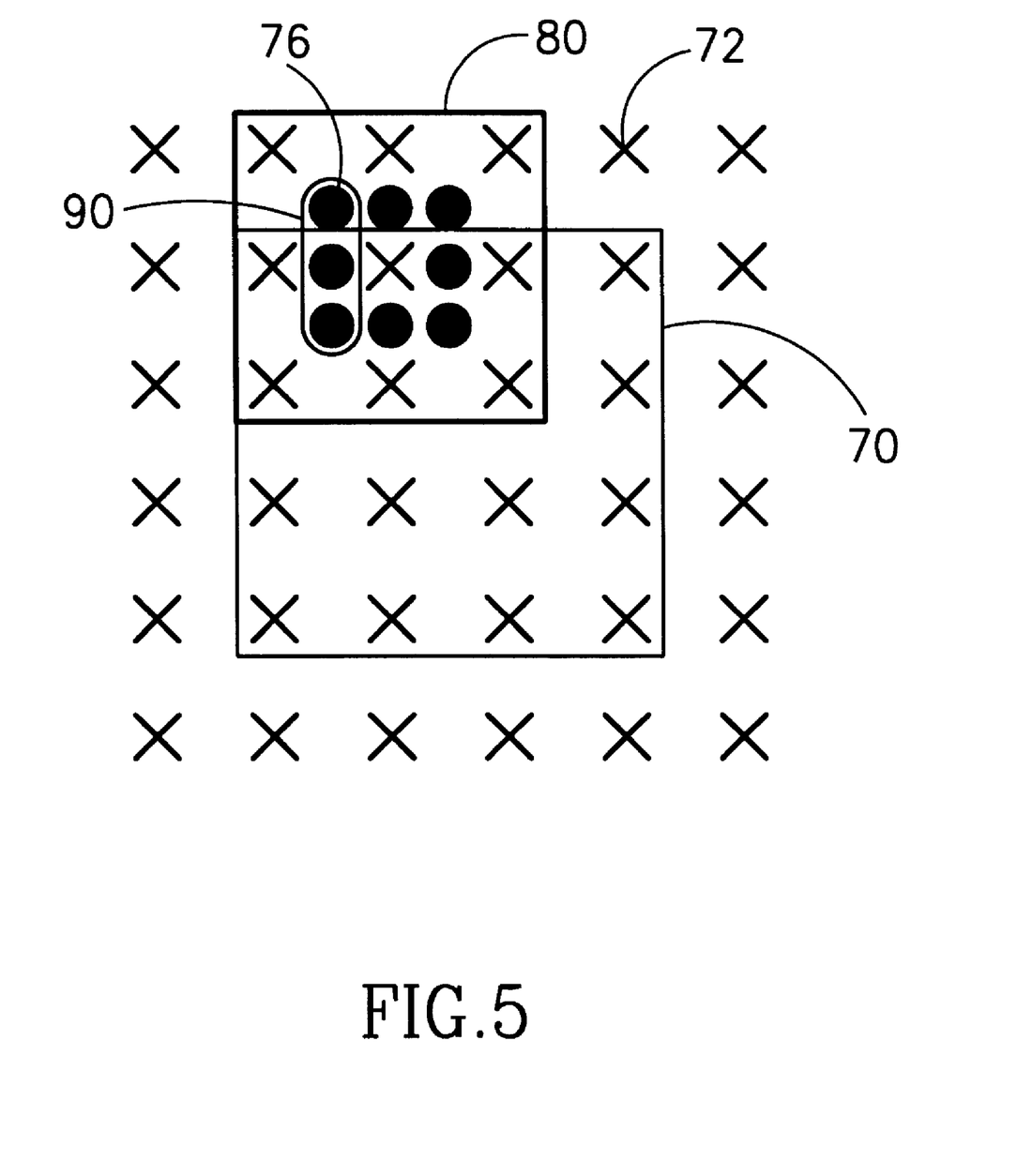
FIG. 5 illustrates the eight half pixel locations associated with the top mid-left pixel in the template macro block.

The eight half pixel locations associated with the top mid-left pixel in the template macro block 70 is illustrated in FIG. 5. The full pixels 72 situated in square box 80 are required to calculate the half pixels 76 surrounding the mid-left full pixel in the top row of the macro block 70.

For each full pixel in the block 70, all eight half pixel values must be calculated. Note, however, that the left three half pixels associated with the mid-left full pixel, enclosed within circle 90, are also the right three half pixels for the left full pixel. These half pixels were previously calculated for the left full pixel and do not need to be calculated again. Thus, the full pixels in columns other than the leftmost column only require the determination of five unique half pixels because the remaining three were calculated for the previous full pixel. Furthermore, for each full pixel, only three of the five half pixels need to be calculated because the lower two half pixels can be calculated in association with the full pixel in the row below. The only exceptions to this are the first and the last rows in block 70.

Figure 6:
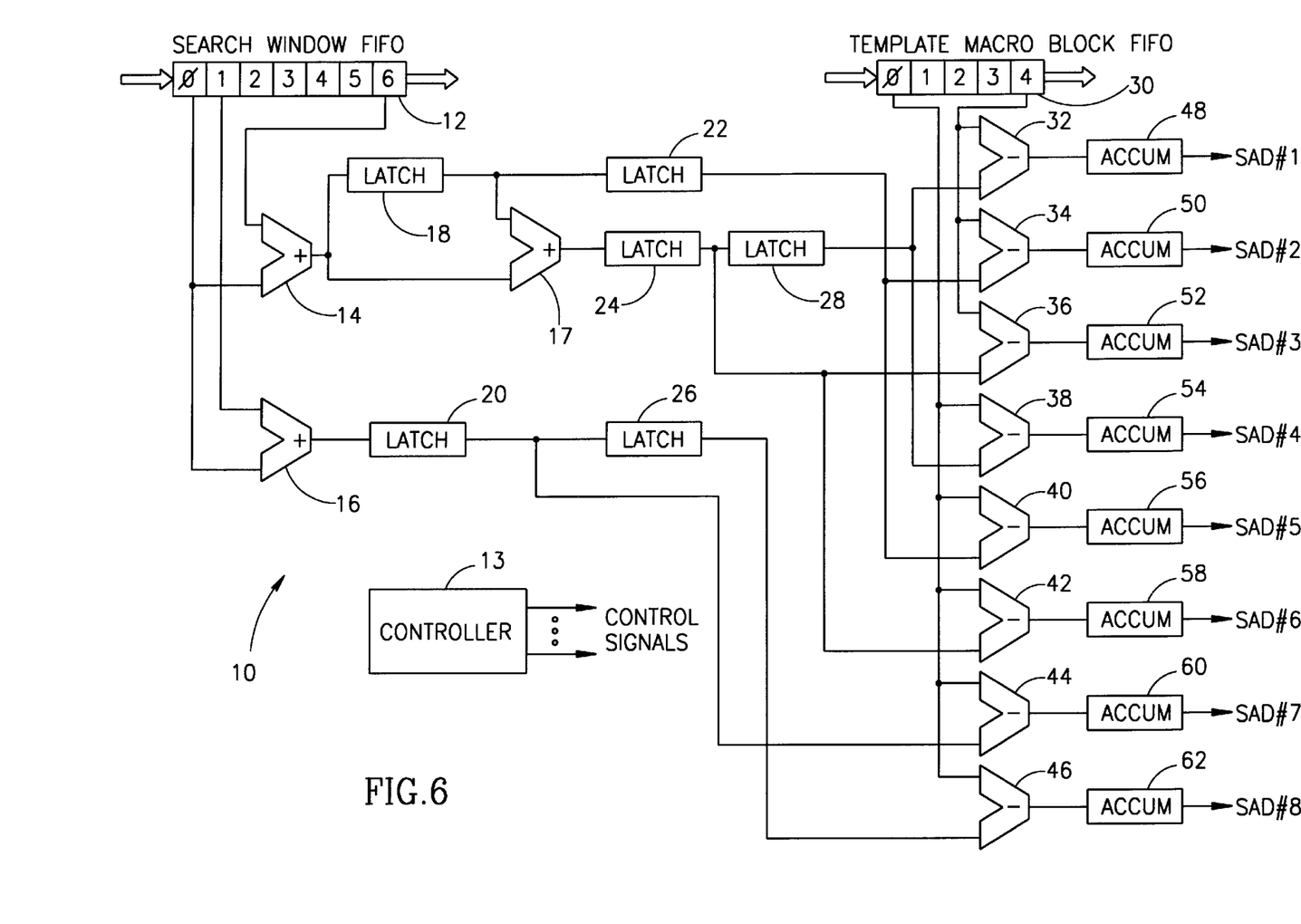
FIG. 6 is a high level block diagram illustrating the half pixel SAD generator constructed in accordance with a preferred embodiment of the present invention.

The apparatus and method of calculating the SAD values for each of the eight half pixels will now be described in more detail. A high level block diagram illustrating the half pixel SAD generator constructed in accordance with a preferred embodiment of the present invention is shown in FIG. 6. The present invention operates to calculate the half pixels serially. Seven search window pixels and five template macro block pixels are input to registers. Half pixels are interpolated from the search window pixels and the template macro block pixels are compared to these half pixels. The resulting differences are input to an accumulator which functions to take the absolute value of the difference and add it to an accumulator register. During the next cycle, an additional new full pixel from the search window is read into the search window FIFO. The search window pixels are again interpolated to create new half pixels. The template macro pixels are compared to the new half pixels and the resulting new differences are added to the differences calculated in the previous cycle. This process is repeated for all the pixels in the block of search window pixels holding the minimum SAD calculated during the full pixel search and the pixels surrounding this block (FIG. 1).

The half pixel SAD generator, generally referenced 10, comprises two first in first out (FIFO) arrays. The first is the search window FIFO 12 which comprises seven registers, each register for holding a search window pixel. The second is the template macro block FIFO 30 which comprises five registers, each register for holding a pixel from the template macro block. The arrows indicate the direction pixels are written into and out of the FIFOs. Both FIFOs are fed pixels starting from the top left of the pixel blocks and continuing to the right. At the end of a row, the process continues from the left edge of the row below.

The generator 10 also comprises a plurality of adders for summing values and registers or latches for providing delays of intermediate results. The input to the adders may be the output of other adders, output from a latch or output of a register in the FIFO.

The principle is to load the search window FIFO with one complete row of pixels plus one pixel. This permits the half pixels between full pixels from two adjacent rows to be calculated in addition to the half pixels between adjacent pixels in the same row. This principle is also applied to the template macro block FIFO. One complete row of pixels plus one pixel are loaded into the template macro block FIFO to permit the calculation of half pixels between pixels of adjacent rows.

In particular, the inputs to adder 14 are the contents of registers 0 and 6 in the search window FIFO. The input to adder 16 are the content of registers 0 and 1 in the search window FIFO. The output of adder 14 is input to the latch 18 and a third adder 17. The other input to the adder 17 is the output of latch 18, which is also input to latch 22. The output of adder 17 is input to latch 24 whose output is input to latch 28. The output of adder 16 is input to latch 20. The output of latch 20 is input to latch 26.

The output of latches 20, 22, 24, 26, 28 are input to a bank of eight subtractors 32, 34, 36, 38, 40, 42, 44, 46. Each subtractor is associated with one of the half pixels. The adders 14, 16, 17 function to generate five of the half pixels unique to each full pixel. The divide by four for the corner half pixels and the divide by two for the non corner half pixels is performed at a later time after the differences have been summed. The latches provide delays necessary in generating the five half pixels.

The output of latch 22 is input to subtractors 34 and 40. The output of latch 24 is input to subtractors 36 and 42. The output of latch 28 is input to subtractors 32 and 38. The output of latch 20 is input to subtractor 44. The output of latch 26 is input to subtractor 46. The content of register 0 of the template macro block FIFO is input to subtractors 38, 40, 42, 44, 46. The content of register 4 of the template macro block FIFO is input to subtractors 32, 34, 36. As differences are calculated by the subtractors, they are input to accumulators 48, 50, 52, 54, 56, 58, 60, 62. One accumulator is associated with each subtractor. The input to the accumulator is the output of its associated subtractor. The output of the accumulators represent the SAD results for the eight half pixels.

Figure 7:
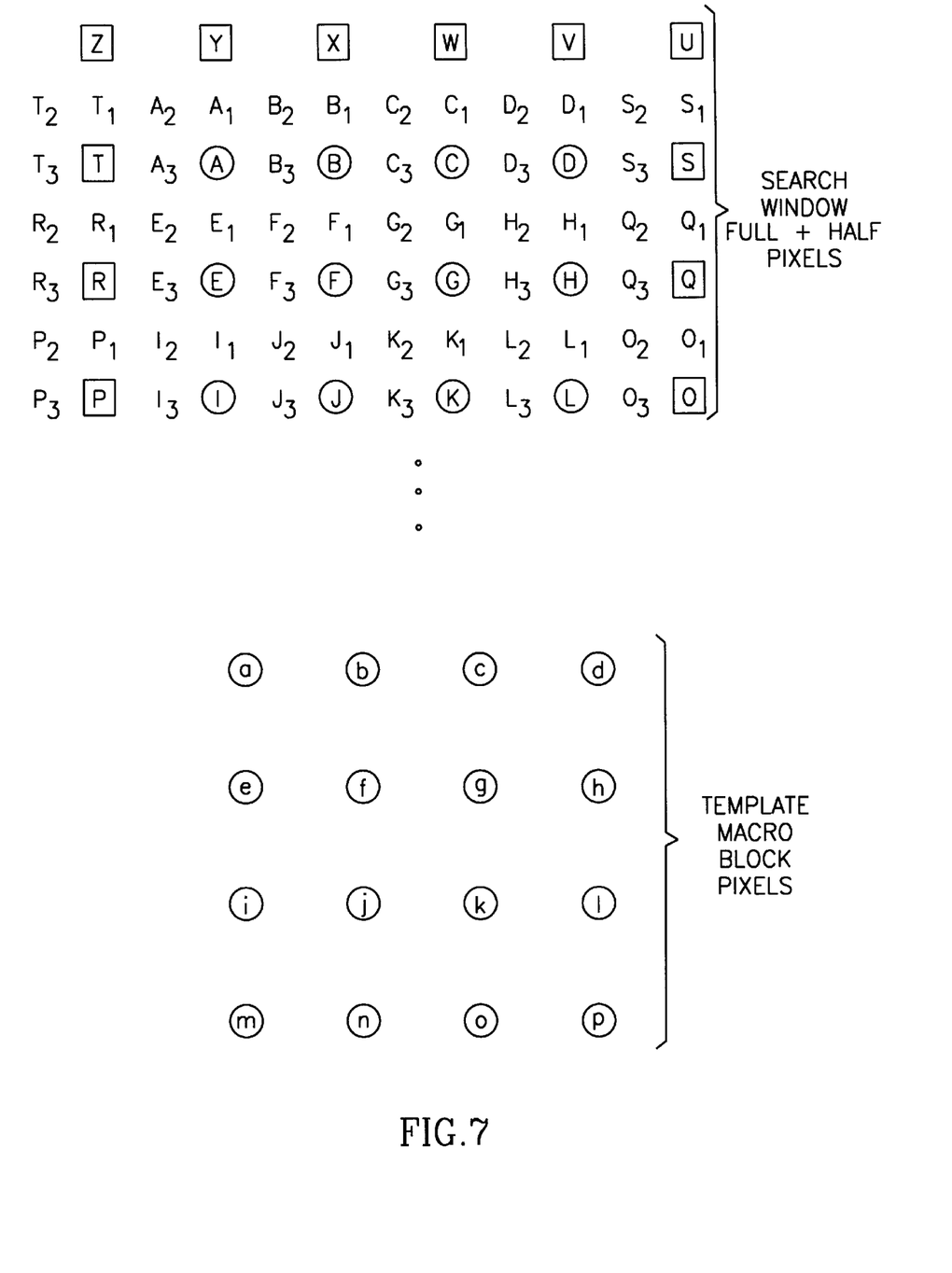
FIG. 7 illustrates a portion of a sample search window showing full pixels and their associated half pixels as well as the template macro block pixels.

Note that it is not mandatory that the accumulator perform the absolute value function. Alternatively, the absolute function may be performed by the subtractors.

three unique half pixels calculated for each full pixel are subscripted 1, 2, 3. The pixels in the template macro block are represented as lower case letter enclosed within circles.

TABLE 1

Operation of the Half Pixel SAD Generator

| | Search Window FIFO | | | | | | | Latch | | | | | | TMB FIFO | | | | | Accumulator | | | | | | | |
|---|---|---|---|---|---|---|---|---|---|---|---|---|---|---|---|---|---|---|---|---|---|---|---|---|---|---|
| Cycle | 0 | 1 | 2 | 3 | 4 | 5 | 6 | 18 | 20 | 22 | 24 | 26 | 28 | 0 | 1 | 2 | 3 | 4 | 48 | 50 | 52 | 54 | 56 | 58 | 60 | 62 |
| 0 | T | U | V | W | X | Y | Z | $T_1$ | $T_3$ | | | | | | | | | | | | | | | | | |
| 1 | A | T | U | V | W | X | Y | $A_1$ | $A_3$ | $T_1$ | $A_2$ | $T_3$ | | | | | | | | | | | | | | |
| 2 | B | A | T | U | V | W | X | $B_1$ | $B_3$ | $A_1$ | $B_2$ | $A_3$ | $A_2$ | a | | | | | | | | | | | | |
| 3 | C | B | A | T | U | V | W | $C_1$ | $C_3$ | $B_1$ | $C_2$ | $B_3$ | $B_2$ | b | a | | | | | | | $a-A_2$ | $a-A_1$ | $a-B_2$ | $a-B_3$ | $a-A_3$ |
| 4 | D | C | B | A | T | U | V | $D_1$ | $D_3$ | $C_1$ | $D_2$ | $C_3$ | $C_2$ | c | b | a | | | | | | $b-B_2$ | $b-B_1$ | $b-C_2$ | $b-C_3$ | $b-B_3$ |
| 5 | S | D | C | B | A | T | U | $S_1$ | $S_3$ | $D_1$ | $S_2$ | $D_3$ | $D_2$ | d | c | b | a | | | | | $c-C_2$ | $c-C_1$ | $c-D_2$ | $c-D_3$ | $c-C_3$ |
| 6 | R | S | D | C | B | A | T | $R_1$ | $R_3$ | $S_1$ | $R_2$ | $S_3$ | $S_2$ | | | | | | | | | $d-D_2$ | $d-D_1$ | $d-S_2$ | $d-S_3$ | $d-D_3$ |
| 7 | E | R | S | D | C | B | A | $E_1$ | $E_3$ | $R_1$ | $E_2$ | $R_3$ | $R_2$ | | | | | | | | | | | | | |
| 8 | F | E | R | S | D | C | B | $F_1$ | $F_3$ | $E_1$ | $F_2$ | $E_3$ | $E_2$ | e | d | c | b | a | | | | | | | | |
| 9 | G | F | E | R | S | D | C | $G_1$ | $G_3$ | $F_1$ | $G_2$ | $F_3$ | $F_2$ | f | e | d | c | b | $a-E_2$ | $a-E_1$ | $a-F_2$ | $e-E_2$ | $e-E_1$ | $e-F_2$ | $e-F_3$ | $e-E_3$ |
| 10 | H | G | F | E | R | S | D | $H_1$ | $H_3$ | $G_1$ | $H_2$ | $G_3$ | $G_2$ | g | f | e | d | c | $b-F_2$ | $b-F_1$ | $f-G_2$ | $f-F_2$ | $f-F_1$ | $f-G_2$ | $f-G_3$ | $f-F_3$ |
| 11 | | | | | | | | | | | | | | | | | | | $c-G_2$ | $c-G_1$ | $g-H_2$ | $g-G_2$ | $g-G_1$ | $g-H_2$ | $g-H_3$ | $g-G_3$ |

A controller 13 provides the appropriate control signals, e.g., clock, enable, etc., to the FIFOs, adders, latches, subtractors and accumulators. The timing of the control signals can be derived from the timing table presented below. The table describes the contents of each of the FIFOs, adders, latches, subtractors and accumulators for a number of clock cycles.

As stated previously, the registers for holding the search window pixels and template macro block pixels are implemented as a FIFO. However, the example presented here implements the method of the present invention using a minimum number of registers. One skilled in the art could implement a half pixel SAD generator using a different number of FIFOs or FIFOs with a different number of registers without departing from the essence of the invention.

Using the systolic processing hardware of FIG. 6 the half pixel SAD results can be determined using minimal hardware and at low cost. Further, the generator of the present invention only requires each full pixel value to be accessed from memory once. The calculation of half pixels and corresponding SAD values does not require redundant memory accesses or redundant half pixel calculations. Each half pixel is calculated only once.

Another advantage of the half pixel generator of the present invention is that rounding accuracy is maintained until the end of the accumulation process. In other words, the division, i.e., by two or four, are performed after all the pixels values have been summed for each SAD value, increasing the accuracy of each.

To aid in understanding the operation of the present invention, a table that describes the contents of each of the FIFOs, adders, latches, subtractors and accumulators for the first 11 clock cycles is presented below as Table 1. Table 1 was constructed using the pixel labels shown in FIG. 7. A portion of the search window full pixel block is illustrated in the upper portion of the Figure. The template macro block pixels is illustrated in the lower portion of the Figure. The full search window pixels are represented by capital letters within circles. The search window pixels surrounding the block, used to calculate the half pixels on the edge, are represented by capital letters within square boxes. The half pixels are represented as subscripted capital letters. The With reference to FIG. 6 and 7, the search window FIFO is first filled beginning with the top row of pixels within the square boxes. Thus, pixels Z, Y, X, W, V, U and T are input to the FIFO. This is the point at which cycle 0 begins. During this cycle the values T1 and T3 are calculated. The value T3 is not used. During cycle 1, pixel A is shifted into the FIFO and pixel Z is shifted out as it is no longer needed once T1 was calculated. T1 will be added later to A1 to generate A2. During cycle 1 the half pixels A1, A2 and A3 are generated. The half pixels T1 and T3 simply are shifted into latches 22 and 26, respectively.

At cycle 2 the half pixels B1, B2 and B3 are calculated and half pixels A1, A2 and A3 are shifted into latches 22, 28 and 26, respectively. Half pixel B2 is generated by adding A1 and B1 together. In this cycle the first template macro block pixel, pixel a, is input to the template macro block FIFO so that the first differences can be generated.

In the next cycle, cycle 3, the three half pixels C1, C2, C3 associated with full pixel C are generated and half pixels B1, B2, and B3 are shifted. Full pixel b is shifted into the FIFO and the first differences are calculated. Subtractors 36, 40, 42, 44, 46 calculate the difference between pixel a and the output of latches 28, 22, 24, 20 and 26, respectively. The difference results a-A2, a-A1, a-B2, a-B3 and a-A3 are input to accumulators 54, 56, 58, 60, 62, respectively.

The process continues with a new set of three half pixels being calculated for each pixel input into the search window FIFO. The differences between the five upper half pixels associated with each full pixel, e.g., A1, A2, A3, B2, B3 for full pixel A, and the corresponding template macro block pixel, i.e., pixel a, are generated during each cycle. The three lower half pixels, e.g., E2, E1, F2 cannot be calculated until the pixels from the following row are input to the FIFO.

The edge pixels in square boxes surrounding the block pixels in circles are required for certain half pixel calculations. The results obtained that are not needed for half pixel calculations are discarded and not used to generate differences to be input to the accumulators. This is apparent during cycles 7 and 8 where no values are clocked into the accumulators. The controller provides the appropriate clock and enable signals to achieve this.

Once the template macro block FIFO fills, i.e., cycle 8, eight differences are generated and accumulated rather than just five during cycles 3 to 6. The process outlined in Table 1 continues until all 36 pixels have been processed. At that point, the accumulators hold the SAD results for each of the eight possible half pixels. These are combined with the original best match from the full search and the minimum of all nine SAD values is determined.

While the invention has been described with respect to a limited number of embodiments, it will be appreciated that many variations, modifications and other applications of the invention may be made.

What is claimed is:

1. An apparatus for generating half pixel sum of the absolute differences (SAD) between a block of full pixels contained within a search window memory and template pixels contained in a predefined template macro block memory, said apparatus comprising:

search window first in first out (FIFO) means for holding full pixels contained in said search window, said search window FIFO having a length equal to the length of said block of full pixels plus three, said search window FIFO having taps on the first, second and last locations thereof;

template macro block FIFO means for holding template pixels contained in said template macro block, said template macro block FIFO having a length equal to the length of said template macro block plus one, said template macro block FIFO having taps on the first and last locations thereof;

interpolating means coupled to said search window FIFO means, said interpolating means for calculating the values of half pixels surrounding each said full pixel, said interpolation means adapted to receive as input said taps on said search window FIFO and said taps on said template macro block FIFO;

subtracting means coupled to said interpolating means and said template macro block FIFO means, said subtracting means for calculating the difference between said half pixels and said template pixels;

absolute value means coupled to said subtracting means, said absolute value means for generating the absolute value of the output of said subtracting means;

accumulator means coupled to the output of said absolute value means, said accumulator means for maintaining a sum of the absolute differences output by said absolute value means for each of said half pixel SAD values; and controller means for generating the appropriate control signals to enable the generation of said half pixel SAD values.

2. The apparatus according to claim 1, wherein said search window FIFO comprises a sufficient number of registers to hold an entire row of full pixels plus at least one pixel from the following row from said search window.

3. The apparatus according to claim 1, wherein said template macro block FIFO comprises a sufficient number of registers to hold an entire row of full pixels plus at least one pixel from the following row from said template macro block.

4. The apparatus according to claim 1, wherein said interpolating means comprises adders and registers suitably arranged so as to calculate the values of half pixels surrounding each said full pixel.

5. The apparatus according to claim 1, wherein said subtraction means comprises two input subtractors.

6. The apparatus according to claim 1, wherein said subtraction means and said absolute value means together comprise two input subtractors incorporating an absolute value function.

7. The apparatus according to claim 1, wherein said accumulator means and said absolute value means together comprise an accumulator incorporating an absolute value function at its input.

8. The apparatus according to claim 1, wherein each said full pixel and each said template pixel are accessed from said search window memory and said template macro block memory, respectively, only once.

9. A method for generating half pixel sum of the absolute difference (SAD) values between a block of full pixels contained within a search window memory and template pixels contained in a predefined template macro block memory, said method comprising the steps of:

providing a search window first in first out (FIFO) for shifting through full pixels contained in said search window, said search window FIFO having a length equal to the length of said block of full pixels plus three, said search window FIFO having taps on the first, second and last locations thereof;

providing a template macro block FIFO for shifting through template pixels contained in said template macro block, said template macro block FIFO having a length equal to the length of said template macro block plus one, said template macro block FIFO having taps on the first and last locations thereof;

interpolating one time only for each of said full pixels, the values of half pixels surrounding each of said full pixels in the horizontal, vertical and diagonal directions, said interpolation utilizing only said taps on said search window FIFO and said taps an said template macro block FIFO;

calculating the difference between said half pixels and said template pixels;

determining the absolute value of said differences generated during said step of calculating; and accumulating a sum of the absolute differences generated during said step of determining for each of said half pixels SAD values.

10. The method according to claim 9, wherein each said full pixel and each said template pixel are accessed from said search window memory and said template macro block memory, respectively, only once.

11. The apparatus according to claim 1, wherein said interpolating means comprises at the most three interpolation adders.

12. The apparatus according to claim 1, wherein said interpolating means comprises a first, second and third interpolation adder, said first interpolation adder coupled to said first and second locations of said search window FIFO, said second interpolation adder coupled to said first and last locations of said search window FIFO, said third interpolation adders coupled to the output of second interpolation adder non delayed and delayed by one pixel time.

* * * * *